(12) United States Patent
Khan et al.

(10) Patent No.: US 9,601,929 B2
(45) Date of Patent: Mar. 21, 2017

(54) SELF-ALIGNING DATA CONNECTIVITY FOR CHARGER

(75) Inventors: Taussif Khan, Monroe, NJ (US); Robert Falkenthal, Verona, NJ (US)

(73) Assignee: Cellco Partnership, Basking Ridge, NJ (US)

(*) Notice: Subject to any disclaimer, the term of this patent is extended or adjusted under 35 U.S.C. 154(b) by 1093 days.

(21) Appl. No.: 13/412,351

(22) Filed: Mar. 5, 2012

(65) Prior Publication Data

US 2013/0229148 A1  Sep. 5, 2013

(51) Int. Cl.
| | | |
|---|---|---|
| H02J 7/00 | (2006.01) | |
| H02J 7/02 | (2016.01) | |
| H04B 5/00 | (2006.01) | |

(52) U.S. Cl.
CPC ............ *H02J 7/0004* (2013.01); *H02J 7/025* (2013.01); *H04B 5/0031* (2013.01); *H04B 5/0037* (2013.01); *H04B 5/0093* (2013.01)

(58) Field of Classification Search
CPC ........ H02J 7/0004; H02J 7/025; H04B 5/0037
USPC .......................................... 320/107, 108, 115
See application file for complete search history.

(56) References Cited

U.S. PATENT DOCUMENTS

| | | |
|---|---|---|
| 7,684,185 B2 | 3/2010 | Farrugia |
| 7,906,936 B2 | 3/2011 | Azancot et al. |
| 2009/0096413 A1 | 4/2009 | Partovi et al. |
| 2010/0081377 A1* | 4/2010 | Chatterjee et al. .......... 455/41.1 |
| 2010/0146308 A1* | 6/2010 | Gioscia et al. ................ 713/300 |
| 2011/0050164 A1* | 3/2011 | Partovi et al. ................. 320/108 |
| 2011/0136550 A1* | 6/2011 | Maugars .............. H04B 5/0037 455/573 |
| 2012/0206090 A1* | 8/2012 | Hyun-Jun ............... H02J 7/025 320/107 |

OTHER PUBLICATIONS

Nilay Patel, "Audyssey Audio Dock: South of Market Edition offers high-end Bluetooth music streaming for your phone," retrieved Jun. 3, 2011. <http://www.engadget.com/2010/09/15/audyssey-audio-dock-south-of-market-edition-offers>.
"Palm Touchstone Standalone Charging Dock for Pre Plus-Palm Pre Plus Cradles," retrieved Jun. 6, 2011. <http://store.precentral.net/palm-touchstone-standalone-charging-dock/6A39A5015.htm>.

(Continued)

*Primary Examiner* — Edward Tso
*Assistant Examiner* — Aaron Piggush

(57) ABSTRACT

A charger includes a planar charging surface, a magnet, a charging circuit and a data circuit. The charging surface has at least two data contact tracks for electrical connection to data contacts of a chargeable device when disposed on the planar charging surface. The data circuit includes the data tracks, a data port, and electrical connection between the data contact tracks and the data port. The charging circuit has a charging feature configured to apply a driving current to the chargeable device through the charging surface. The magnet is configured to align the chargeable device such that the data contacts of the chargeable device align with the data contact tracks. When aligned via the magnet, the data contacts of the chargeable device contact the data contact tracks of the charging surface, thereby permitting data transfer between the chargeable device and an external device connected to the data port.

17 Claims, 4 Drawing Sheets

(56) References Cited

OTHER PUBLICATIONS

"Touchstone Standalone Inductive Desktop Charger: Accessory Details," retrieved Jun. 6, 2011. <http://www.verizonwireless.com/b2c/store/accessory?&cm_ite=**Slcik%20Deals>.
"iHome IP47BR Alarm Clock Radio with Bluetooth Speakerphone," retrieved Jun. 3, 2011. <http://www.thebuyfly.com/ihome-ip47br-alarm-clock-radio-with-bluetooth-speakerphone.html>.

* cited by examiner

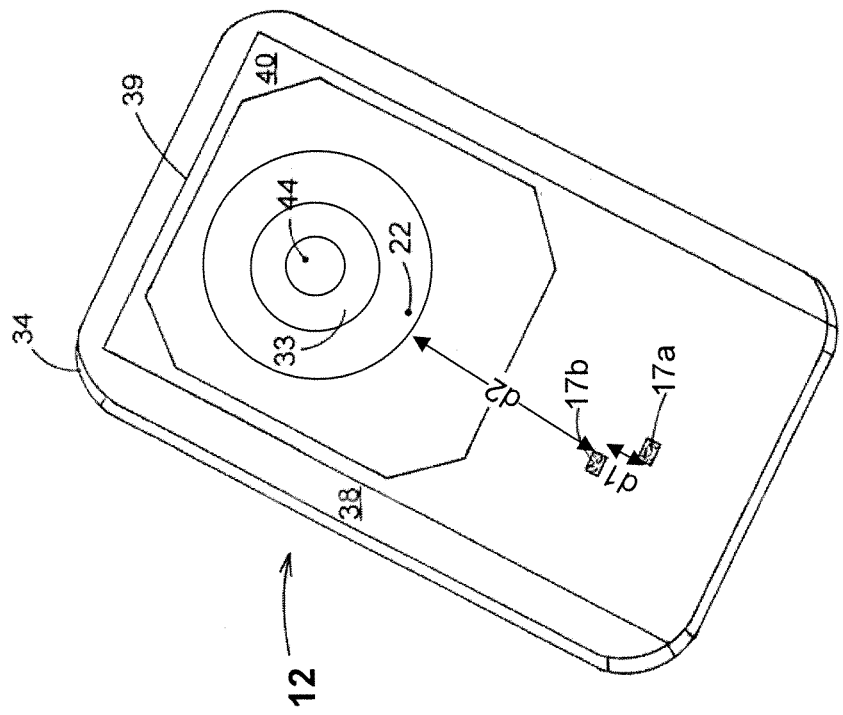
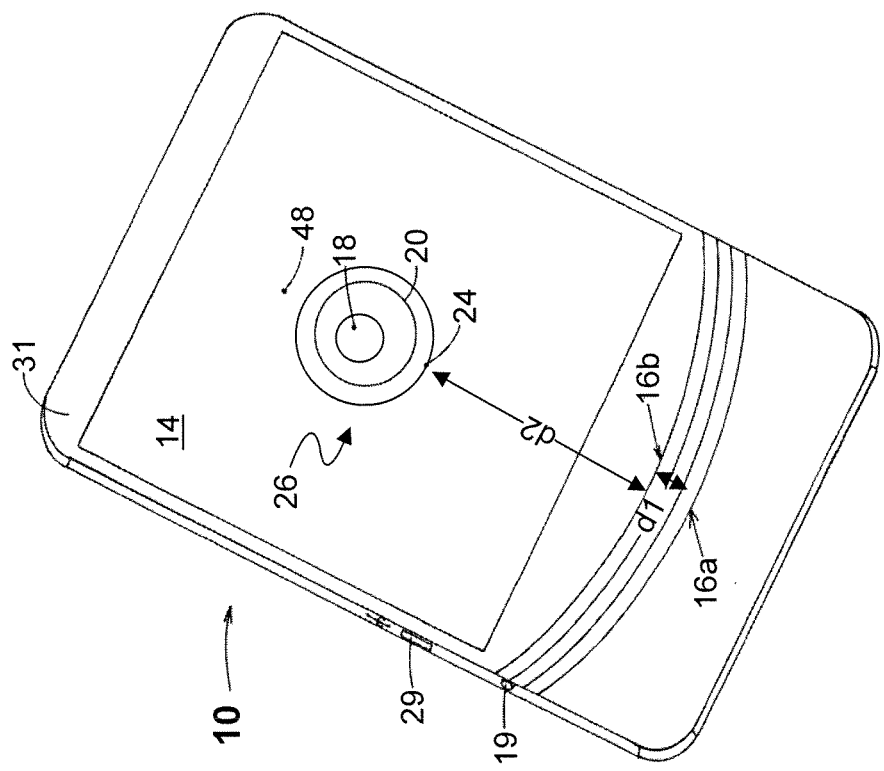
FIG. 1B
FIG. 1A

SELF-ALIGNING DATA CONNECTIVITY FOR CHARGER

BACKGROUND

In recent years, inductive chargers have gained popularity. Inductive chargers provide electrical charge to chargeable devices wirelessly via coils present in the charger and in a corresponding chargeable device. By aligning the coils, inductive current can be transferred from the inductive charger to the chargeable device. Because proper alignment provides a better transfer of energy, some inductive chargers use magnets to provide alignment between the coil in the charger and the coil in the corresponding chargeable device. Thus, inductive chargers provide the ability to charge a chargeable device without physically inserting anything, such as a cable, into the chargeable device.

There are situations when the user may desire to transfer data between the chargeable device and other equipment while the device is on the charger, for example, transferring music, media files, presentations, and other large files. However, data transfer between a chargeable device being charged on an inductive charger and another device (such as a personal computer or a landline router) generally involves either wireless data connectivity or the use of a cable to connect the chargeable device to the other device. The use of a cable connection for data connectivity is generally undesirable to users of inductive chargers, as the use of a cable along with wireless charging provides few advantages over the use of a single cable, such as a uniform serial bus (USB) cable, to simultaneously charge and provide data connectivity. Inductive chargers incorporating wireless data connectivity, such as Bluetooth or Wireless Fidelity (Wi-Fi) connectivity, provide a complete wireless experience to the user. The user can simply place the chargeable device on the inductive charger and a magnet aligns the back cover of the device and its coil with the corresponding coil in the charger and begins inductive charging while having wireless data connectivity. However, wireless data connectivity has low throughput as compared to the data connectivity provided by the physical connections of cables. Inductive charger users desiring to transfer large amounts of information, such as music libraries, must choose between the slow transfer associated with wireless data connectivity and the inconvenience of physically inserting a cable into the chargeable device.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1A illustrates a perspective view of a charger in accordance with an exemplary embodiment of the present disclosure.

FIG. 1B illustrates a perspective view of a chargeable device in accordance with an exemplary embodiment of the present disclosure.

DETAILED DESCRIPTION OF PREFERRED EMBODIMENTS

Figure 2:
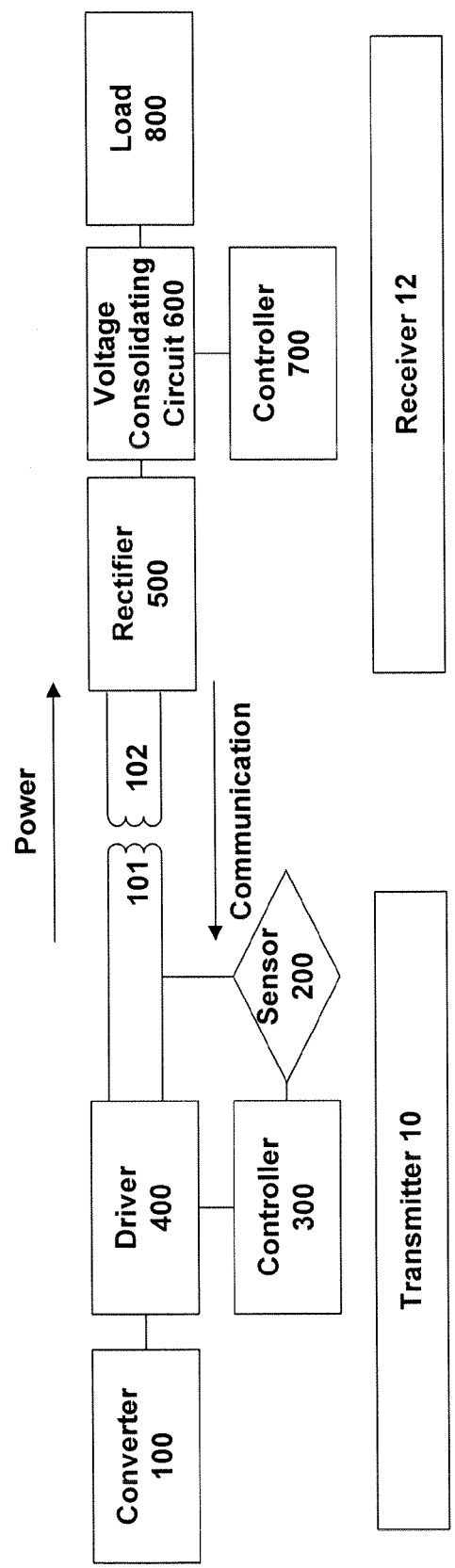
FIG. 2 illustrates a block diagram of charging and data circuits in accordance with an exemplary embodiment of the present disclosure.

In the following detailed description, numerous specific details are set forth by way of examples in order to provide a thorough understanding of the relevant teachings. However, the present teachings may be practiced without such details. In other instances, well known methods, procedures, components, and/or circuitry have been described at a relatively high-level, without detail, in order to avoid unnecessarily obscuring aspects of the present teachings.

The teachings herein help to alleviate one or more problems with data connectivity associated with chargeable devices charging on conventional contact chargers. In an example, a "charger" or "self-aligning charger" may include, for example and without limitation, a planar charging surface, a magnet, a charging circuit and a data circuit. The charging surface has at least two data contact tracks for electrical connection to data contacts of a chargeable device when disposed on the planar charging surface. The data circuit includes the data tracks, a data port, and electrical connection between the data contact tracks and the data port. The charging circuit has a charging feature configured to apply a driving current to the chargeable device through the charging surface. The magnet is configured to align the chargeable device such that the data contacts of the chargeable device align with the data contact tracks. When aligned via the magnet, the data contacts of the chargeable device contact the data contact tracks of the charging surface, thereby permitting data transfer between the chargeable device and an external device connected to the data port.

In an example, a portable chargeable device may include one or more electric components, a rechargeable battery, a battery charging circuit, a charging feature, a magnetic receptor, and a housing. The rechargeable battery is for supply power to operate the one or more electronic components. The battery charging circuit is coupled to the battery. The charging feature is for receiving a driving current from a charging circuit of a charger to drive the battery charging circuit. The housing is of a portable form factor enclosing the one or more electronic components, the battery, the charging circuit, and the charging feature. The housing includes data contacts on an outer surface of the housing. The data contacts are connected via lines to a data port of the one or more electronic components. The magnetic receptor is configured to interact with a magnet of the charger, for causing alignment of the data contacts of the housing with data contact tracks of the charger. When aligned, the data contacts contact the data contact tracks, permitting data transfer between the chargeable device and the charger.

A cover for a chargeable device includes data contacts, and a magnetic receptor. The data contacts are on an exterior surface of the cover. The data contacts are configured for connection to a data port of an electronic component of the chargeable device. The magnetic receptor is configured to interact with a magnet of the charger, for causing alignment of the data contacts of the cover with data contact tracks of the charger. When aligned, the data contacts contact the data contact tracks, permitting data transfer between the chargeable device and the charger.

As a result, the user of the charger may simply place the chargeable device on the charger and allow the magnet to align the chargeable device in a position appropriate for charging. This alignment of the chargeable device by the magnet automatically provides alignment appropriate for data transfer via physical contact between data contacts of the chargeable device and data contact tracks of the charger. Thus, the user may experience the convenience associated with inductive charging and the speed and improved data throughput associated with a wired data connection, without the hassle of plugging a cable into the chargeable device, as generally required for using conventional chargers.

With the teachings herein, there is no need to insert the chargeable device into a receptacle such as a docking station or other charging or data transfer mechanism requiring either alignment or insertion of a connector into a port, or both. Rather, the chargeable device can be placed on the charger without needing to precisely align the chargeable device and charger. After the chargeable device is placed on the charger, the charger and the chargeable device interact via magnetic field to automatically provide an appropriate charging and data connection alignment.

Reference now is made in detail to the examples illustrated in the accompanying drawings and discussed below. FIG. 1A illustrates a charger 10 for use with a chargeable device 12 (illustrated in FIG. 1B). The charger 10 includes a casing 31. The magnet 20 and a charging feature 24 are within the casing 31, and the charging surface 14 defines a portion of the casing 31. The charging surface 14 of charger 10 may be implemented to be sufficiently planar in order to support the chargeable device 12 (or other chargeable device) thereon and to provide a secure physical connection between the charger 10 and the chargeable device 12 while charger 10 is charging chargeable device 12, as will be described in further detail below. The charging surface 14 can be sized or shaped in a variety of ways, so long as it provides support to the chargeable device 12 or other chargeable device (not shown) during charging. The charger 10 is able to charge chargeable device 12 when the chargeable device 12 is in contact with the charging surface 14, e.g., after being placed by a user onto the charging surface 14. The charge is produced contactlessly, inductively, wirelessly, or via automatically aligned contact between the chargeable device 12 and the charger 10. Direct contact may be achieved allowing a charge to be provided without the user manually inserting a connector into a socket or providing physical alignment. For inductive charging, the charging surface 14 passes an inductive current to the chargeable device 12. The inductive current produced by the charging surface 14 may be generated, for example, from a wired current passing through the charging surface 14 via electrical wires for conducting current through or around the charging surface 14.

As shown in FIG. 1A, charging surface 14 has at least two data contact tracks 16a and 16b ("tracks 16a-b"). The data contact tracks 16a-b provide an electrical connection for the transfer of data between the chargeable device 12 of FIG. 1B and the charger 10 of FIG. 1A, including data transfer through the charger 10 to or from an external device such as a personal computer (PC), a laptop, or any other type of electronic device (not shown) connected via cable or otherwise to the charger 10. Such data transfer may include, for example and without limitation, uploading, downloading, or synchronizing music, contacts lists, calendar updates, or device backup or archiving. Data may be transferred at various data transfer rates (e.g., 480 Mbits/second or 60 MB/second) based on the external device and the type of data connection that is used for the transfer. In an example, the type of data connection used for the data transfer between charger 10 and chargeable device 12 may be a universal serial bus (USB) connection. Accordingly, two data contact tracks 16a-b, e.g., a positive and a negative track, may be provided to conform with USB cable specifications. For example, track 16a may be designated to be the positive track and thus, used as an upstream data bus (e.g., providing upload from the charger 10 to the chargeable device 12). Similarly, track 16b may be designated to be the negative track and thus, used as a downstream data bus (e.g., providing download from the chargeable device 12 to the charger 10).

The data contact tracks 16a-b may be sized, spaced, and shaped as desired in order to provide electrical connection to data contacts of a wide variety of chargeable devices including, for example, data contacts 17a and 17b ("data contacts 17a-b") of the chargeable device 12, as illustrated in FIG. 1B. Further, the data contact tracks 16a-b may be recessed, or have a female configuration with respect to the charging surface 14. The depth of the recess may be, for example, from about ⅛ inch to about ¼ inch. However, any recess depth may be used as desired. Alternatively, the data contact tracks 16a-b may have a male configuration or a flat configuration in some instances. The shape of data contact tracks 16a-b may be curved, for example, to allow the data contacts 17a-b of the chargeable device 12 to align with the data contact tracks 16a-b in a variety of different rotational positions about an alignment point 18 of charger 10, as illustrated in FIG. 1A. Alternatively, the data contact tracks 16a-b could be straight or have another shape. The data contact tracks 16a-b also may extend across a substantial width of the charging surface 14, or alternatively, may extend only a relatively short length (e.g., as small as 9/10 of the width of the charger 10). Similarly, the width of each data contact track 16a-b may be adjusted as desired (e.g., from about ⅛ inch to about ¼ inch) so as to properly align with data contacts 17a-b. As shown in FIG. 1A, a distance d1 between the data contact tracks 16a-b and a distance d2 between a charging feature 24 and the nearest data track 16b may each be adjusted as desired to ensure proper alignment. In an example implementation, distance d1 may be set to approximately half of one inch while the distance d2 may be set to approximately 1.25 inches. Typically, the data contact tracks 16a-b of the charger 10 should be larger (e.g., wider and longer) than the data contacts 17a-b of the chargeable device 12 or other data contacts on various other chargeable devices to ensure sufficient contact. This also may allow the charger 10 to be used with a variety of different chargeable devices.

As illustrated in FIG. 1A, the charger 10 includes a charging port 19 for obtaining input power with which to apply a driving current to the chargeable device 12. For example, this current may be transmitted via a micro USB connector, thereby providing power (e.g., 4 volts at 1 amp) to the charger 10 for enabling inductive charging. Alternatively, the charger 10 could have a male power connector that plugs directly into a wall socket. The charging port 19 may be integrated with or implemented as a separate from a data port 29, as shown in the example charger 10 of FIG. 1A. Thus, a single port, in place of charging port 19 and/or data port 29, may be used to provide both power and data connectivity.

The charger 10 also includes a magnet 20 to provide alignment between the chargeable device 12 and the charger 10. The magnet 20 defines the alignment point 18. Thus, in operation, the magnet 20 aligns the chargeable device 12 of FIG. 1B as it is placed by a user on the charging surface 14 of the charger 10, such that the data contacts 17a-b on the chargeable device 12 align with the data contact tracks 16a-b of the charger 10. More specifically, the magnet 20 is configured to align the chargeable device 12 such that a charging feature 22 of the chargeable device 12 in FIG. 1B aligns with a charging feature 24 of the charger 10 in FIG. 1A. In wireless or inductive applications, the charging feature 24 may be, for example, an inductive coil. Alternatively or additionally, the charging feature 24 of charger 10 can be implemented using a set of contact pins or grooves or other direct contact connection for providing an electrical connection between the charger 10 and the device 12. However, magnet 20 helps to ensure that precise alignment is not required for the user to successfully pair the electrical contacts of the charger 10 and the chargeable device 12, thereby enabling the transfer of charge and/or data from charger 10 to chargeable device 12, as described above.

The charger 10 also includes a charging circuit 26 (illustrated in FIG. 2, as will be described in further detail below), that drives a charging feature 24 of the charger 10. The charging feature 24 may be used to apply a driving current from charger 10 to the chargeable device 12 of FIG. 1B through the charging surface 14 of charger 10. In some implementations, the charging feature 24 may include an inductive coil that is centered about an alignment point 18, as described above. The inductive coil may be used by charger 10 to provide an inductive charge for delivering the driving current to the chargeable device 12. Alternatively, the charging feature 24 need not be centered about the alignment point 18 and could include a set of pins or grooves or other direct contact connection to provide an electrical connection. Thus, various configurations of charging feature 24 may be used to provide charging that does not require precise alignment by the user while a signal can pass through the charging surface 14 (e.g., via wired connection or via inductive current), as described above. When aligned, the charging feature 22 of the chargeable device 12, as shown in FIG. 1B, communicates with the charging feature 24 of the charger 10, thereby permitting application of a driving current to the charging circuit of the charger 10.

Figure 3:
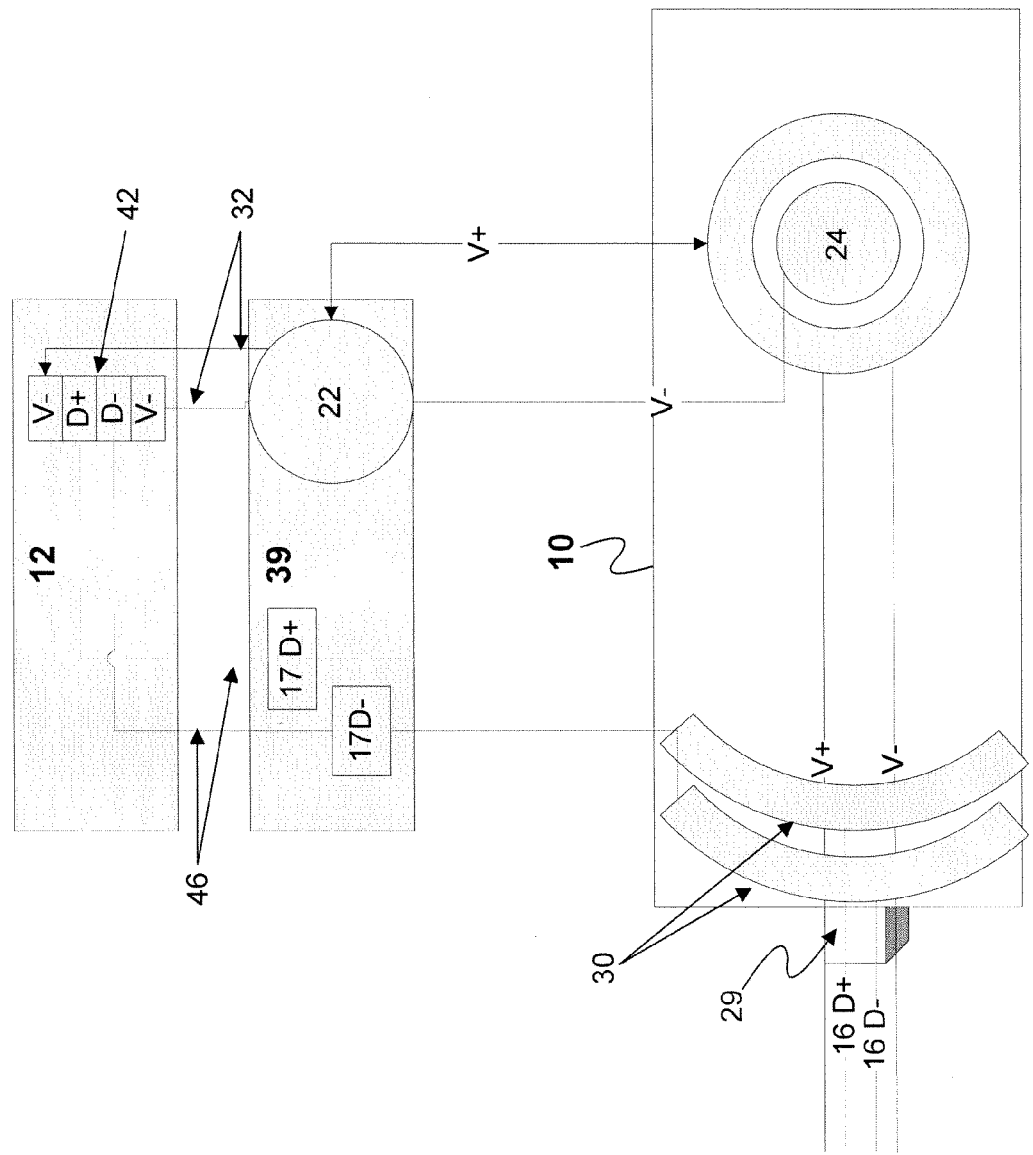
FIG. 3 illustrates a schematic view of charging and data circuits in accordance with an exemplary embodiment of the present disclosure.

As will be described in further detail below with respect to FIG. 3, charger 10 includes electrical connectors (e.g., electrical connectors 30, as shown in FIG. 3) connecting the data contact tracks 16*a-b* with a data port 29 (e.g., a USB or other type of data port) of the charger 10, in order to provide electrical communication between the data contact tracks 16*a-b* and the data port 29. The data contact tracks 16*a-b* and the charging feature 24 of the charger 10 can be spaced appropriately to keep noise or interference below a predetermined threshold. For example, the spacing between the contact tracks 16*a-b* and an inductive coil of the charging feature 24 may be based on a predetermined distance needed to keep any magnetic interference caused by inductive charging below a predefined threshold. The predefined threshold can be based on a tolerance limit or acceptable level of interference for human exposure to radiofrequency electromagnetic fields, which may be defined by guidelines or rules related to radiofrequency interference exposure potential. Such a radiofrequency interference exposure potential may be established by, for example, an industry standards group, rule-making authority or government organization (e.g., the United States Federal Communications Commission). For example, different radiofrequency exposure potential guidelines may be established for different radiofrequency bands based on an amount of human tissue that may be exposed with respect to each radiofrequency band (e.g., 100 kHz to 205 kHz at 16 watts w/kg averaged over one gram of tissue). In some implementations, the spacing between the contact tracks 16*a-b* and the charging feature 24 may be a predetermined distance (e.g., at least 1.5 inches), based on the above-described radiofrequency exposure potential.

Additionally, each of the data contact tracks 16*a-b* may be spaced apart according to a predetermined distance in order to balance functionality with one or more design characteristics. For example, placing the data contact tracks 16*a-b* too close to one another on the charger 10 may cause difficulties with self-alignment, as described above. On the other hand, placing data contact tracks 16*a-b* too far apart may limit the design of the charger 10 with respect to other features due to the limited surface area of the charger 10. Further, the placement of the data contact tracks 16*a-b* may be selected such that charger 10 may be used with multiple mobile devices (e.g., mobile phones) and their respective covers. Thus, a desired uniform spacing of the data contact tracks 16*a-b* may be a predetermined distance that can work with a wide range of device (or device case/cover) sizes.

Similarly, the depth of each of the data contact tracks 16*a-b* may be determined so as to balance a desired functionality and design characteristics. In an example, the depth of each data contact tracks 16*a-b* is selected in order to keep the chargeable device 12 in place (and contact with the chargeable device 12 can be maintained) during device movement, e.g., while the user is in motion or traveling with the chargeable device 12 when it is connected to the charger 10. The depth of the data contact tracks 16*a-b* of the charger 10 may also be dependent on the length of the data contacts 17*a-b* of the chargeable device 12. For example, the depth of each of the data contact tracks 16*a-b* may be selected so as to ensure that the chargeable device 12 via the data contacts 17*a-b* fits appropriately or securely onto the charger 10, e.g., such that the back cover or case of chargeable device 12 sits flush with the charger 10 or can be coupled with charger 10 with minimal extra spaces or gaps between the two devices. Further, the data contacts 17*a-b* may be limited to a predetermined size or length based on how much each of the data contacts 17*a-b* is allowed to protrude or be exposed relative to the surface of the back cover or case of the chargeable device 12. Additionally, the size or length of the data contacts 17*a-b* may be determined in order to minimize or avoid any issues that may adversely impact the ergonomics of the chargeable device 12 or ease of holding or carrying the chargeable device 12 (and charger 10).

Referring now to FIG. 1B, the chargeable device 12 can be a portable device, such as, a mobile communications device, a music or other storage device, a remote control for a gaming system or other electronic device, a media device, tablet, or other portable computing device, or any of a number of other devices having a rechargeable battery. The chargeable device 12 includes the charging feature 22 for receiving a driving current from the charging feature 24 of the charger 10 of FIG. 1A, as described above, to drive a battery charging circuit (e.g., charging circuit 32, as shown in FIG. 3 and as will be described further below). The charging feature 22 of the chargeable device 12 may be implemented as an inductive coil in a charging surface located adjacent to an exterior surface 40 of a cover 39, as shown in the example of FIG. 1B. Alternatively, the charging feature 22 can be a set of pins or grooves or other direct contact connection to provide an electrical connection, so long as it does not require precise alignment by the user in order to effectively mate with the corresponding electrical contacts of the charger 10.

The chargeable device 12 also includes a magnetic receptor 33. The magnetic receptor 33 of the chargeable device 12 may include a magnet, or may simply be a magnetic material that reacts to the magnet 20 of the charger 10. The magnetic receptor 33 is configured to interact with the magnet 20 of the charger 10, causing alignment of the charging feature 22 of the chargeable device 12 with the charging feature 24 of the charger 10. The magnetic receptor 33 is also configured to interact with the magnet 20 of the charger 10, causing alignment of the data contacts 17*a-b* of a housing 34 of the chargeable device 12 with the data contact tracks 16*a-b* of the charger 10. The housing 34 of a portable form factor encloses one or more electronic components, a rechargeable battery, and the charging feature 22 of the charging circuit 32 (illustrated in FIG. 4). The housing 34 has data contacts 17*a-b* on an outer surface 38 of the housing 34. The data contacts 17*a-b* provide an electrical connection between the chargeable device 12 and the charger 10. The data contacts 17*a-b* have a male configuration, such that they protrude or project outward from the outer surface 38 of the housing 34. The protruding dimensions of the data contacts 17*a-b* may be approximately ¼ inch×¼ inch×¼ inch. Alternatively, the data contacts 17*a-b* may be flush with or even recessed in the housing 34, in instances where the data contact tracks 16*a-b* of the charger 10 are not recessed.

A cover 39 may form a part of the housing 34 of the chargeable device 12. Such a cover may form a portion of the housing 34, while being separable from the housing 34. For example, the cover 39 may replace a standard battery compartment cover of a mobile communications device or other chargeable device 12, without requiring replacement of the entire housing of the device. This permits an existing chargeable device 12 to be retrofitted with data transfer capabilities for use in inductive charging. Thus, the data contacts 17*a-b* on an outer surface 38 of the housing 34 may be present on an exterior surface 40 of the cover 39.

The magnetic receptor 33 of the housing 34 may form a portion of the cover 39. The data contacts 17*a-b* on the exterior surface 40 of the cover 39 can be configured for connection to a data port 42 of one of the electronic components of the chargeable device 12. The magnetic receptor 33, when part of the cover 39, may still be configured to interact with the magnet 20 of the charger 10, causing alignment of the data contacts 17*a-b* on the cover 39 with data contact tracks 16*a-b* on the charger 10. When aligned, the data contacts 17*a-b* of the cover 39 contact the data contact tracks 16*a-b* of the charger 10, permitting data transfer between the charger 10 and the chargeable device 12 attached to the cover 39. The cover 39 can include an inductive coil or other charging feature 22 configured for electrical connection to the rechargeable battery of the chargeable device 12. The cover 39 can also include a radio frequency (RF) tag, such as the RF tag 44 of the housing 34, as described below. The cover 39 has connections to connect with the components of the rest of the chargeable device 12, such that it can provide a suitable data and charging connection.

Also, as shown in FIGS. 1A and 1B, respectively, the charger 10 can include a radio frequency (RF) reader 48 and the chargeable device 12 can include a passive RF tag 44. The RF reader 48 and the RF tag 44 may allow for the charger 10 to obtain information about the chargeable device 12, so as to provide an appropriate charging rate and charging limits. For example, the RF tag 44 may hold information specifying the charging rate and the battery capacity associated with the chargeable device 12. The RF reader 48 and the RF tag 44 may additionally allow the chargeable device 12 to provide the charger 10 with information as to the proper charging rate of the chargeable device 12, thereby enabling the charging process to be performed efficiently and in accordance with device specifications. This also enables the integrity of the charging process to be maintained.

Referring now to FIG. 2, a regulated power supply system is illustrated. The power supply system includes a converter 100 configured to convert alternating current to direct current. The direct current is provided to the driver 400 which is configured to drive the first or primary coil 101. The varying current in the first or primary coil 101 creates a varying magnetic flux in the core and thus a varying magnetic field through the secondary coil 102. This varying magnetic field induces voltage in the second coil 102. Since a load is connected to the secondary coil 102, an electric current flows from the secondary coil 102 and energy is transferred from the transmitter 10 to the battery or load 800 in the receiver 12.

The rectifier 500 connected to the secondary coil 102 is configured to convert the AC to DC. The DC output of the rectifier 500 may be varying. The voltage consolidating circuit 600 is configured to smooth and eliminate ripples from the output of the rectifier 500. The controller 700 is configured to control the operation of the voltage consolidating circuit 600.

The sensor 200 senses the amount of current that is being delivered to the load 800 and provides this information to controller 300. The controller 300 compares the desired state (e.g., desired amount of current to be supplied to the load 800) with the actual state (e.g., the detected current) and sends a control signal to the driver 400 for providing an appropriate amount of current to the primary coil 101.

FIG. 3 shows example block diagrams of the data circuits for the charger 10 and chargeable device 12, including charging cover 39 of the chargeable device 12, as described above. As shown in FIG. 3 and described above, cover 39 of the chargeable device 12 includes charging feature 22 (e.g., an inductive coil) configured to provide an electrical connection to the rechargeable battery of the chargeable device 12. In operation, when aligned via the magnet 20 (as shown in FIG. 1A) of the charging feature 24 of the charger 10 and the magnetic receptor 33 (as shown in FIG. 1B) of the charging feature 22 of the chargeable device 12, the data contacts 17*a-b* of the chargeable device 12 touch or contact the data contact tracks 16*a-b* of the charging surface 14 (as shown in FIG. 1A) of the charger 10. This alignment and corresponding contact permits data transfer between the chargeable device 12 and the charger 10. As will be described in further detail below with respect to FIG. 4, this alignment and contact also permits data transfer between the chargeable device 12 and an external device, e.g., a personal computer (PC) or desktop computing device (not shown) connected to the data port 29 of the charger 10. As shown in FIG. 3, the data contacts 17*a-b* of the cover 39 are connected to the chargeable device 12 via electrical lines 46 from a data port 42, which may be connected to one or more additional electronic components (not shown) of the chargeable device 12. The chargeable device 12 includes a rechargeable battery (not shown) for supplying power to operate the one or more electronic components of the chargeable device 12. The chargeable device 12 also includes a set of electrical lines 32 for delivering charge received from the charger 10 via the charging feature 22 of cover 39 to the rechargeable battery. The lines 32 may be connected to, for example, a battery charging circuit of the chargeable device 12 that is coupled to the rechargeable battery.

Figure 4:
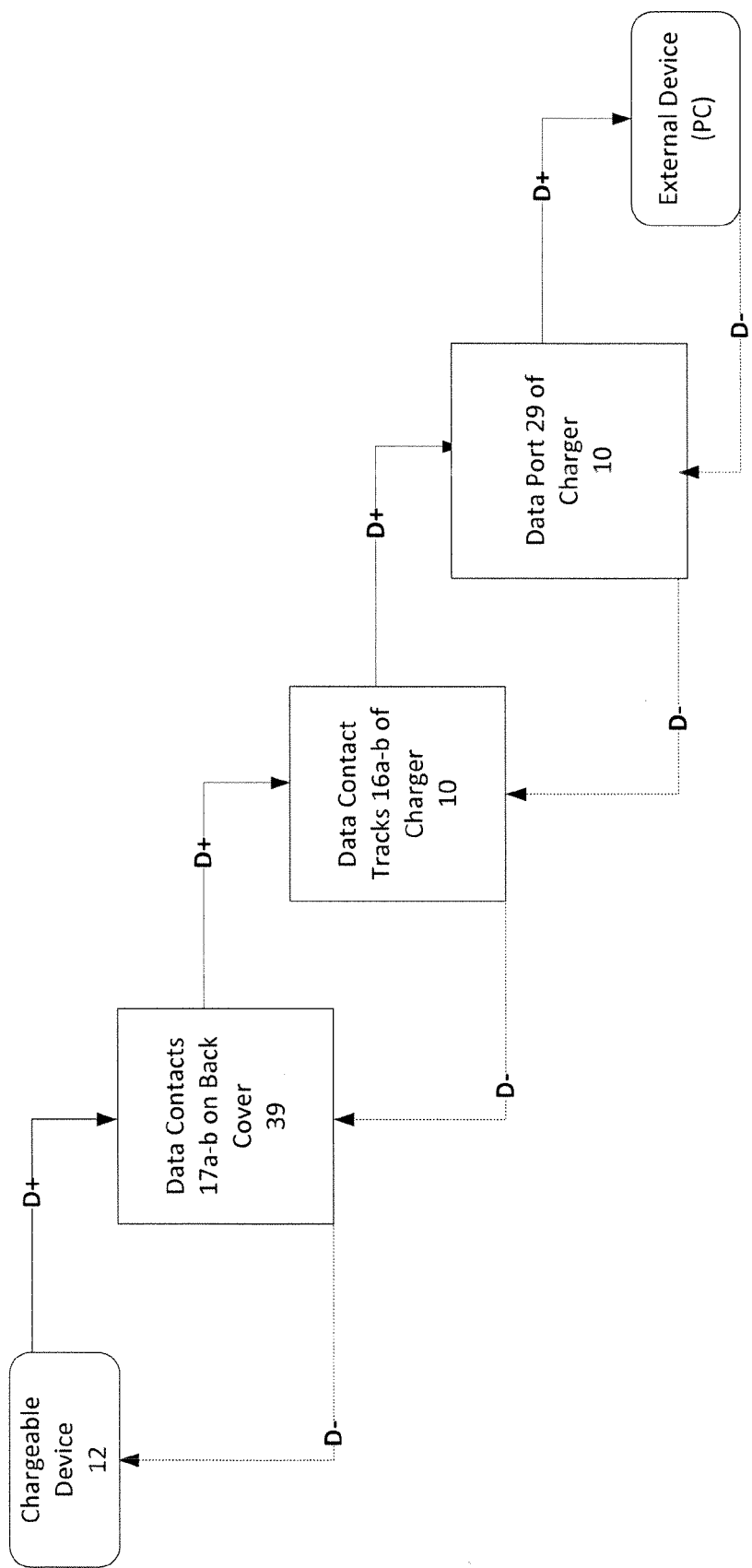
FIG. 4 illustrates an example data flow between a chargeable device and an external device via the charger.

FIG. 4 illustrates an example data flow between the chargeable device 12 and an external device via charger 10. For example, the chargeable device 12 may be a mobile handset and the external device may be a PC or desktop computing device, as described above. As shown in FIG. 4 and described above, the external device may be communicatively coupled to data port 29 of the charger 10. Data port 29 may be, for example, a USB port or interface that enables data transfer between the charger 10 and the external device via a wired USB connection. This data can then be transferred to and from the chargeable device 12 and the charger 10 via the data contacts 17*a-b* located on the cover 39 of the chargeable device 12 and the data contact tracks 16*a-b* of the charger 10, as described above.

Referring back to FIG. 3, the data contacts 17*a-b* of the cover 39 may be connected to the chargeable device 12 via lines 46 for purposes of transferring data, described above. Also, as shown in FIG. 3 and described above, the chargeable device 12 includes a set of electrical lines 32 for receiving electrical charge (e.g., at charging feature 22 of cover 39) from the external device via the charger 10 (e.g., via charging feature 24). Thus, a benefit of the subject technology and example configuration, as illustrated by the flowchart of FIG. 4, include improving user experience by providing the convenience of inductive charging for restoring power to the device while also providing the speed and improved data throughput of a wired data connection for transferring data to and from the device and a PC or desktop computing device, without having to connect any cables to the chargeable device.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A charger comprising:
   a planar charging surface comprising at least two data contact tracks for electrical connection to data contacts of a chargeable device when disposed on the planar charging surface;
   a magnet, having a doughnut configuration;
   a charging circuit; and
   a data circuit comprising the data contact tracks, a data port, and electrical connectors between the data contact tracks and the data port, wherein:
      the charging circuit comprises a charging feature configured to apply a driving current to the chargeable device through the charging surface,
      the magnet is configured to magnetically interact with a magnet receptor member of the chargeable device in a manner urging lateral alignment of the chargeable device to a position such that the alignment causes the data contacts of the chargeable device to laterally align with the data contact tracks, and
      when aligned via the magnet, the data contacts of the chargeable device contact the data contact tracks of the charging surface, thereby permitting data transfer between the chargeable device and an external device connected to the data port; and
   a radio frequency (RF) reader for obtaining, from a RF tag in the chargeable device, a charging rate and a charging limit of the chargeable device.

2. The charger of claim 1, wherein the magnet is further configured to align the chargeable device such that a charging feature of the chargeable device aligns with the charging feature of the charger.

3. The charger of claim 1, wherein the charging feature of the charger comprises an inductive coil.

4. The charger of claim 1, wherein the data circuit and the charging circuit are spaced to keep interference below a predefined threshold.

5. The charger of claim 4, wherein the predefined threshold is based on a predefined radiofrequency interference exposure potential defining a tolerance limit for human exposure to a radiofrequency electromagnetic field.

6. The charger of claim 5, wherein the data circuit and the charging circuit are spaced apart by a predetermined distance so as to mitigate magnetic interference due to inductive charging.

7. The charger of claim 6, wherein the predetermined distance is at least 1.5 inches.

8. The charger of claim 1, wherein the data contact tracks are recessed with respect to the charging surface.

9. The charger of claim 1, wherein the magnet defines an alignment point, and wherein the data contact tracks are curved, to allow the data contacts of the chargeable device to align with the data contact tracks in a variety of different rotational positions about the alignment point.

10. The charger of claim 9, wherein the charging feature of the charger comprises an inductive coil centered about the alignment point.

11. The charger of claim 1, comprising a casing, wherein the magnet and the charging feature of the charger are within the casing, and the charging surface defines a portion of the casing.

12. A portable chargeable device comprising:
one or more electronic components;
a rechargeable battery for supply power to operate the one or more electronic components;
a battery charging circuit coupled to the battery;
a charging feature for receiving a driving current from a charging circuit of a charger to drive the battery charging circuit;
a magnetic receptor, wherein the magnetic receptor has a doughnut-shaped configuration;
a housing of a portable form factor enclosing one or more electronic components, the battery, the charging circuit, and the charging feature, wherein:
the housing comprises data contacts on an outer surface of the housing;
the data contacts are connected via lines to a data port of the one or more electronic components;
the magnetic receptor is configured to magnetically interact with the charger in a manner urging lateral alignment of the portable chargeable device and the housing to a position causing alignment of the data contacts of the housing with data contact tracks of the charger; and
when aligned, the data contacts contact the data contact tracks of the charger, permitting data transfer between the chargeable device and the charger; and
a radio frequency (RF) tag for providing, to a RF reader in the charger, a charging rate and a charging limit of the chargeable device.

13. The chargeable device of claim 12, wherein:
the magnetic receptor is further configured to interact with a magnet of the charger such that the magnetic field also urges alignment of a charging feature of the chargeable device with a charging feature of the charger; and
when aligned, the charging feature of the chargeable device communicates with the charging feature of the charger, permitting application of a driving current to the charging circuit of the charger.

14. The chargeable device of claim 12, wherein the charging feature comprises an inductive coil.

15. The chargeable device of claim 12, wherein the charging rate is set according to device specifications.

16. A cover for a chargeable device, comprising:
data contacts on an exterior surface of the cover; and
a magnetic receptor, wherein the magnetic receptor has a doughnut-shaped configuration:
the data contacts configured for connection to a data port of an electronic component of the chargeable device,
the magnetic receptor configured to magnetically interact with a magnet of a charger in a manner urging lateral alignment of the chargeable device with the cover to a position such that the alignment causes alignment of the data contacts of the cover with data contact tracks of the charger; and
when aligned, the data contacts contact the data contact tracks, permitting data transfer between the chargeable device and the charger; and
a radio frequency (RF) tag for providing, to a RF reader in the charger, a charging rate and a charging limit of the chargeable device.

17. The cover of claim 16, comprising an inductive coil configured for electrical connection to a battery of the chargeable device.

* * * * *